Feb. 7, 1928.
P. B. TAYLOR
STILL
Filed March 22, 1926
1,658,541
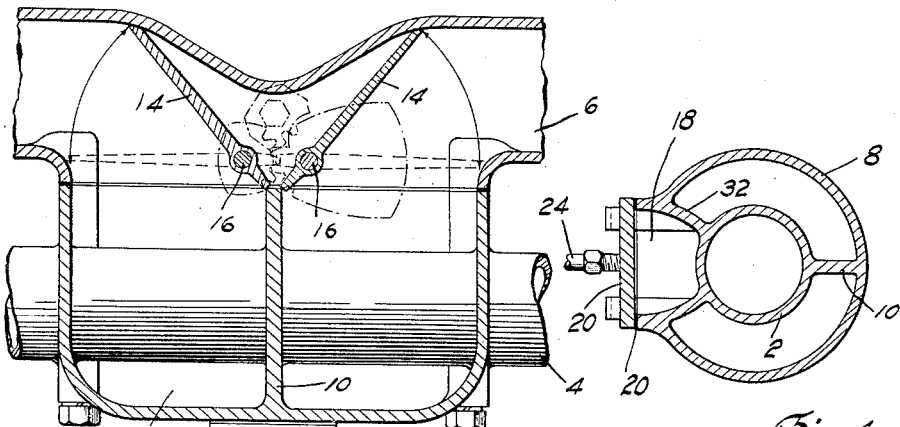
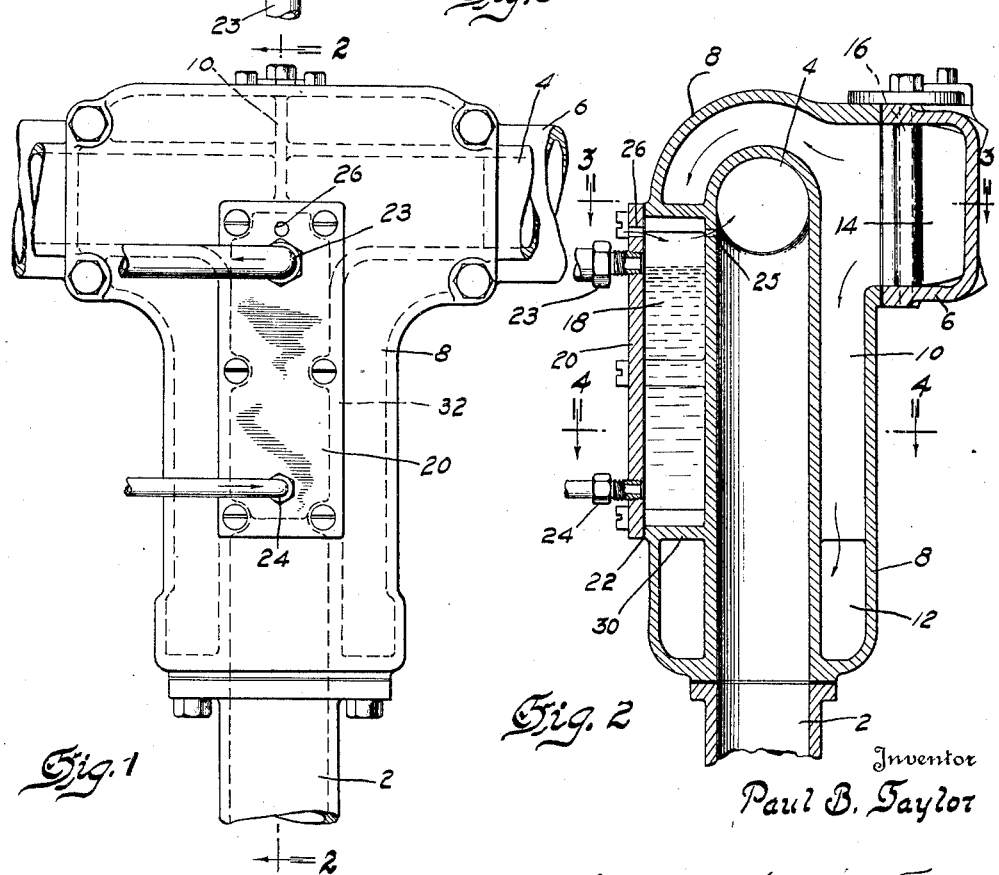
Inventor
Paul B. Taylor Patented Feb. 7, 1928.

1,658,541

UNITED STATES PATENT OFFICE.

PAUL B. TAYLOR, OF PONTIAC, MICHIGAN, ASSIGNOR TO GENERAL MOTORS CORPORATION, OF DETROIT, MICHIGAN, A CORPORATION OF DELAWARE.

STILL.

Application filed March 22, 1926. Serial No. 96,568.

It has heretofore been proposed to make use of the waste heat of an internal combustion engine for the purification by distillation of the lubricating oil used in the engine. Water and fuel which become mixed with the oil during the operation of the engine may thus be driven off.

This proposal has presented many practical problems, chief among which is the control of the application of heat to the oil. There is a certain minimum temperature to which the oil must be raised before any distillation takes place, and there is a certain maximum temperature which, if exceeded, results in breaking down or cracking the oil and "coking" it, rendering the oil unfit for lubrication.

In order to secure sufficiently high temperatures for effective operation it has been necessary to resort to the use of the exhaust gases from the engine, rather than the engine cooling water. The temperature of the exhaust gases varies greatly in accordance with the operation of the engine and with climatic conditions; thus the lowest temperatures will obtain when the engine is operating under light load and at low speed in cold weather, and the highest temperatures will obtain when the engine is operating under heavy load and at high speed in hot weather. The temperature will range anywhere between these extremes in accordance with the load on the engine, the speed at which it is operated, the outside temperature, the efficiency of the cooling system and many other factors.

A number of arrangements have been developed with the object of maintaining the temperature of the still within workable limits. Thermostatic devices have been made use of to control the application of the heating medium to the still; to control the application of a cooling medium to the still; and in some cases to control the flow of oil through the still, so that the rate of flow will increase as the temperature of the still increases, the oil thereby exerting a greater cooling effect. Thermostatic controls are delicate and expensive. They usually comprise a valve in contact with the oil, and this valve frequently becomes clogged by impurities in the oil and by the carbonization of oil thereon as a result of high temperatures.

According to my invention I control the temperature of the still by making use of an inherently balanced heat relation existing in the engine. Thus it is well known that, in general, the temperature of the exhaust gases varies directly as the rate at which the fuel is consumed, or, in other words, roughly in accordance with the load on the engine and the speed at which the engine is operated. It is also well known that the temperature of the gases passing through the intake manifold decreases as the throttle approaches wide open position, this position corresponding to high speed or heavy load operation of the engine.

I have utilized the above phenomena for controlling still temperatures by arranging my still so that it is subjected to the heating influence of the exhaust gases, and also to the cooling influence of the intake mixture. The simplest way of accomplishing this consists in locating the still so that it possesses wall portions in contact with the exhaust manifold, and other wall portions in contact with the intake manifold. By proper design, the ratio of heated wall surfaces to cooled wall surfaces may be made such that the still temperatures are maintained within the desired range.

In applying my invention to existing designs of engine, I have preferably made use of the usual intake manifold heating arrangement commonly provided. I have illustrated a conventional form of mixture heating arrangement, consisting of an exhaust jacket provided around a portion of the intake manifold, valves being arranged at the junction of the exhaust manifold and jacket to control the divertsion of gases about the manifold. These valves are provided with manipulating devices having at least two settings, one for winter operation in which the exhaust gases pass through the jacket, and the other for summer operation in which none, or at least only a small portion of the exhaust gases pass through the jacket. I have preferably secured my still to the jacketed portion of the intake manifold so that portions of the walls of the still are exposed to the temperatures existing in the manifold, and other portions of the walls are subjected to the heating influence of the exhaust gases passing through the said jacket. By so locating the still I obtain the advantage that distillation is greatly reduced when the exhaust by-pass valves are set for summer operation. I thus avoid excessive still temperatures in hot summer weather, and also reduce the amount of distilling action, for during this period of the year oil dilution presents much less of a problem, as the engine temperatures are such that the diluents, such as water vapor and fuel, do not condense and mix with the oil, but are carried outside the engine through the exhaust manifold or the usual breather apertures.

Referring to the drawings:

Figure 1 is a front elevation of my still shown incorporated in the manifolding of an internal combustion engine.

Figure 2 is a section on line 2—2 of Figure 1.

Figure 3 is a section on line 3—3 of Figure 2.

Figure 4 is a section on line 4—4 of Figure 2.

The reference character 2 indicates a portion of the suction conduit of an internal combustion engine, in this case the riser leading from the conventional carburetor and carrying the intake mixture to the branched conduit indicated at 4 which supplies fuel to the engine cylinders. 6 indicates a portion of the exhaust manifold which carries the burned combustion products away from the cylinders. 8 indicates a jacket extending about the riser 2 and also preferably about a portion of the conduit 4. This jacket is in communication with the exhaust manifold 6 at its upper end to permit the passage of exhaust gases through the jacket for warming the intake mixture. A partition 10 extends vertically through the jacket from the top to a point removed from the bottom to provide a port 12 for the passage of the gases.

I have provided means for controlling the passage of exhaust gases through the jacket. This means consists of valves 14 mounted on pivots 16 extending vertically through the exhaust conduit. It will be apparent that when the valves are in the position shown in full lines in Figure 3, the exhaust gases entering at the right of this figure will be diverted by the adjacent valve 14 and the partition 10 down around the bottom of the partition through the passage 12 and thence up into the exhaust conduit. When the valves 14 occupy the position shown in dotted lines none or only a small portion of the exhaust gases will be diverted through the jacket 8 but the gases will instead pass directly through the exhaust conduit 6.

As clearly shown in the figures I have preferably made the forward portion of the partition 10 in the form of a receptacle 18 having an open face which is closed by means of a plate 20 bolted to the receptacle, suitable sealing means indicated at 22 being interposed to provide a liquid tight joint. This receptacle serves as the distillation chamber and the plate 20 is tapped at its top and bottom to receive pipe connections 23 and 24, respectively. Oil is supplied to the chamber 18 through the pipe connection 24 which may be connected in any suitable manner in the oil circulating system. The pipe connection 23 is of larger diameter than the connection 24 and serves to return oil to the engine crankcase. It may also serve for the upward passage of vapors from the crankcase into the space above the surface of the oil in the still, the passage of these vapors over the stream of oil assisting in the removal of diluents from the oil stream. I have provided an aperture 25 in the upper portion of the rear wall of the still, this passage establishing communication between the distillation chamber and the intake manifold. By this means distillates are drawn into the engine. If preferred some other source of suction may be used to remove distillates or the latter may pass off by the action of convection alone. To prevent the formation of a vacuum of such high degree as to tend to draw lubricating oil into the intake passages, I have preferably provided a vent indicated at 26 communicating with the atmosphere. The enlarged diameter of the conduit 23 also has the effect of preventing the formation of too high a vacuum in the distillation chamber and while I have preferred to employ both the vent 26 and an oil discharge conduit of enlarged section, it is obvious that either of these devices may be made to perform this function alone.

In cold weather the valves 14 are adjusted to the position shown in full lines in Figure 3 causing a diversion of the exhaust gases about the intake passages and also about the bottom 30 and side wall portions 32 of the distillation chamber 18. These gases effect a heating of the oil supplied to the chamber through the pipe 24 and the degree of heat conveyed to the oil will vary roughly in accordance with the amount of fuel consumed, in other words, in accordance with the engine load and speed. The rear wall of the chamber 18 is exposed to the action of the gases passing in to the engine. The temperature of these gases decreases as the throttle approaches wide open position, this position corresponding to high speed or heavy load operation of the engine. It will thus be apparent that as more heat is imparted to the still through the surfaces in contact with the exhaust gases an increased cooling action will take place upon the surface or surfaces exposed to the intake gases. Consequently, the cooling and heating effects will tend to offset each other and to maintain the temperature of the still within certain limits. The oil entering the still through the connection 24 will consequently be subject to controlled temperatures which will effect a vaporization of diluents, such as water and fuel, contained in the oil. These diluents will pass from the space above the surface of the oil through the passage 25 into the intake manifold. The vacuum which would otherwise be created in this space is relieved by means of air passing through the aperture 26 and crankcase vapors passing through the connection 23. The oil from the still is returned to the crankcase by overflow through the same connection.

For summer operation the valves 14 are moved to dotted line position, or, perhaps preferably to a position intermediate dotted and full line positions. This has the effect of reducing the volume of exhaust gases passing through the jacket about the intake and thus compensating for the higher temperatures prevailing in the hotter months. This, in combination with the balanced heat control makes it impossible for the still to attain such high temperatures even in the hottest weather and operating under the most unfavorable conditions as to cause charring or coking of the oil. The suction applied to the distillation chamber through the opening 25 will be greater when the throttle approaches closed position. This corresponds to a condition in which the engine is running under light load with low fuel consumption and consequently the heating action of the exhaust gases and the cooling action of the intake mixture are both reduced.

I have illustrated my distillation chamber formed in the jacketed intake casting. As this may give rise to variations in heat conductivity owing to the impossibility of controlling the character of a cast metal wall structure, I may find it preferably to form the distillation chamber of sheet metal and secure it to machined surfaces of the casting. Or, if preferred, all of the parts may be made of sheet metal.

I have described my invention applied to the temperature control of the engine lubricating oil. It is obvious that the invention is of utility in connection with other fluids used about an engine, such as the fuel supply, the low grade liquid fuel now largely used being not infrequently subjected to heating action to insure its ready vaporization.

The described construction is very simple and in the form illustrated involves merely a slight change in manifold construction as now applied in certain automobiles on the market. The arrangement of all piping connections on the plate 20 facilitates assembly, inspection and repair.

I claim:

1. The combination of an internal combustion engine having an exhaust conduit and a suction conduit, of a still arranged to be exposed to the action of at least a portion of the gases passing through each of said conduits, the exhaust gases serving as a heating medium and the intake gases serving as a cooling medium, and means for supplying fluid to said still and withdrawing it therefrom.

2. In the combination above, means for controlling the flow of one of said mediums about the still.

3. The combination of an internal combustion engine having an intake manifold and an exhaust manifold, a portion of said intake manifold having a jacket in communication with the exhaust manifold for the passage of exhaust gases for heating the intake mixture, a distillation chamber mounted on said intake manifold so as to be exposed to the temperatures of the gases flowing therethrough and having wall portions in heat conducting relation with the exhaust gases passing through said jacket, and means for supplying oil to said chamber and withdrawing it therefrom.

4. In the combination above, and means for controlling the passage of exhaust gases through said jacket.

5. In the combination above, suction means for withdrawing distillates from said chamber.

6. The combination of an internal combustion engine having a circulating lubricating system, an exhaust passage and an intake passage, a portion of said intake passage being jacketed, means for bypassing a part of the exhaust gases from said exhaust passage through said jacket, a still mounted adjacent said intake passage so as to be subject to the cooling action of the gases passing therethrough, said still having wall portions in heat conducted relation with the exhaust gases passing through said jacket, said still being arranged in said lubricating system for the passage of lubricant therethrough.

7. In the combination as defined in claim 6, said bypassing means being adjustable to control the passage of exhaust gases through said jacket.

8. In the combination as defined in claim 6, suction means for withdrawing distillates from said still.

9. In the combination as defined in claim 6, suction means for withdrawing distillates from said still comprising a passage leading from the upper portion of said still into the adjacent portion of the intake passage.

10. In an internal combustion engine, the combination of an intake passage, an exhaust jacket for said passage provided with a partition for causing the exhaust gases to follow a tortuous path through said jacket, a portion of said partition being formed to provide a distillation chamber.

11. In the combination as defined in claim 10, said chamber being provided with an open outer face and a plate for closing said face.

12. The combination as defined in claim 10, said chamber being provided with an open outer face and a plate for closing said face, said plate carrying connections for supplying fluid to said chamber and withdrawing it therefrom.

13. The method of controlling the temperature of fluid while undergoing distillation, which consists in simultaneously exposing it to the temperatures of the hot exhaust gases of an internal combustion engine and to the temperatures of the intake gases of the engine, the temperatures of the hot exhaust gases increasing and the cooling effect of the intake gases increasing with increase in engine speed or load.

14. An internal combustion engine having an intake and an exhaust, and a distillation chamber arranged to be simultaneously exposed to the intake and to the exhaust gases so that the heating effect of the exhaust gases is offset by the cooling effect of the intake gases, thereby effecting automatic control of the temperature of the distillation chamber.

15. The combination as defined in claim 14 and means for applying suction to the still to effect removal of distillates.

In testimony whereof I affix my signature.

PAUL B. TAYLOR.